United States Patent
Hasegawa et al.

(10) Patent No.: US 7,804,039 B2
(45) Date of Patent: Sep. 28, 2010

(54) LIQUID PHASE DIFFUSION BONDING METHOD OF METAL MACHINE PART AND SUCH METAL MACHINE PART

(75) Inventors: Yasushi Hasegawa, Futtsu (JP); Ryuichi Honma, Futtsu (JP); Yutaka Takagi, Hashima (JP)

(73) Assignees: Nippon Steel Corporation, Tokyo (JP); Fukuju Industry Corporation Ltd, Gifu (JP)

( * ) Notice: Subject to any disclaimer, the term of this patent is extended or adjusted under 35 U.S.C. 154(b) by 31 days.

(21) Appl. No.: 10/559,040

(22) PCT Filed: Jun. 2, 2004

(86) PCT No.: PCT/JP2004/008011
§ 371 (c)(1), (2), (4) Date: Nov. 29, 2005

(87) PCT Pub. No.: WO2004/105994
PCT Pub. Date: Dec. 9, 2004

(65) Prior Publication Data
US 2006/0163321 A1    Jul. 27, 2006

(30) Foreign Application Priority Data

| Jun. 2, 2003 | (JP) | 2003-156602 |
| Apr. 13, 2004 | (JP) | 2004-118069 |
| May 19, 2004 | (JP) | 2004-149581 |

(51) Int. Cl.
*B23K 11/00*    (2006.01)
(52) U.S. Cl. ............ 219/78.16; 228/193; 228/194; 228/195
(58) Field of Classification Search ........... 228/193, 228/194, 195, 234.1; 219/78.02; 156/304.5
See application file for complete search history.

(56) References Cited

U.S. PATENT DOCUMENTS 4,703,221 A * 10/1987 Ochoa et al. ............... 313/332

(Continued)

FOREIGN PATENT DOCUMENTS

DE        34 46 262        6/1986

(Continued)

OTHER PUBLICATIONS

European Search Report for Application No. EP 04 73 5820 dated Feb. 11, 2010.

*Primary Examiner*—Jessica L. Ward
*Assistant Examiner*—Nicholas P D'Aniello
(74) *Attorney, Agent, or Firm*—Kenyon & Kenyon LLP

(57) ABSTRACT

A liquid phase diffusion bonding method for a metal machine part superior in the quality of the joint and the productivity enabling the bonding time to be shortened, achieving homogenization of the bonding structure and improving the tensile strength, fatigue strength, and joint quality and reliability. This liquid phase diffusion bonding method of a metal machine part is characterized interposing an amorphous alloy foil for liquid phase diffusion bonding at bevel faces of metal materials, performing primary bonding by melt bonding said amorphous alloy foil and said metal material by resistance welding to form a joint, then performing secondary bonding by liquid phase diffusion bonding by reheating said joint to at least the melting point of said amorphous alloy foil, then holding it there to complete the solidification process of said joint.

24 Claims, 5 Drawing Sheets

U.S. PATENT DOCUMENTS

| | | | |
|---|---|---|---|
| 5,759,300 A * | 6/1998 | Hasegawa et al. | 148/403 |
| 5,919,577 A | 7/1999 | Hasegawa et al. | |
| 6,059,175 A * | 5/2000 | Hamada et al. | 228/194 |
| 6,098,871 A * | 8/2000 | Cairo et al. | 228/194 |
| 6,323,458 B1 * | 11/2001 | Nomura et al. | 219/148 |
| 6,514,631 B1 * | 2/2003 | Yamamoto et al. | 428/682 |
| 2003/0044637 A1 * | 3/2003 | Hasegawa et al. | 428/679 |
| 2005/0072830 A1 * | 4/2005 | Ditzel et al. | 228/56.3 |

FOREIGN PATENT DOCUMENTS

| | | | |
|---|---|---|---|
| EP | 0 389 625 | | 10/1990 |
| JP | 4-081282 | | 3/1992 |
| JP | 9-262684 | | 10/1997 |
| JP | 10-29075 | | 2/1998 |
| JP | 11-285860 | * | 4/1998 |
| JP | 11-090619 | | 4/1999 |
| JP | 11-090620 | | 4/1999 |
| JP | 11-090621 | | 4/1999 |
| JP | 11-285860 | | 10/1999 |
| JP | 2001-321962 | | 11/2001 |
| JP | 2002-035958 | | 2/2002 |
| JP | 2002-35958 | | 2/2002 |
| JP | 2002-86278 | | 3/2002 |
| JP | 2003-181651 | | 7/2003 |
| KR | 1990-7000230 | | 8/1990 |
| WO | PCT/JP98/03673 | * | 2/1999 |
| WO | PCT/JP01/04196 | * | 11/2001 |

* cited by examiner

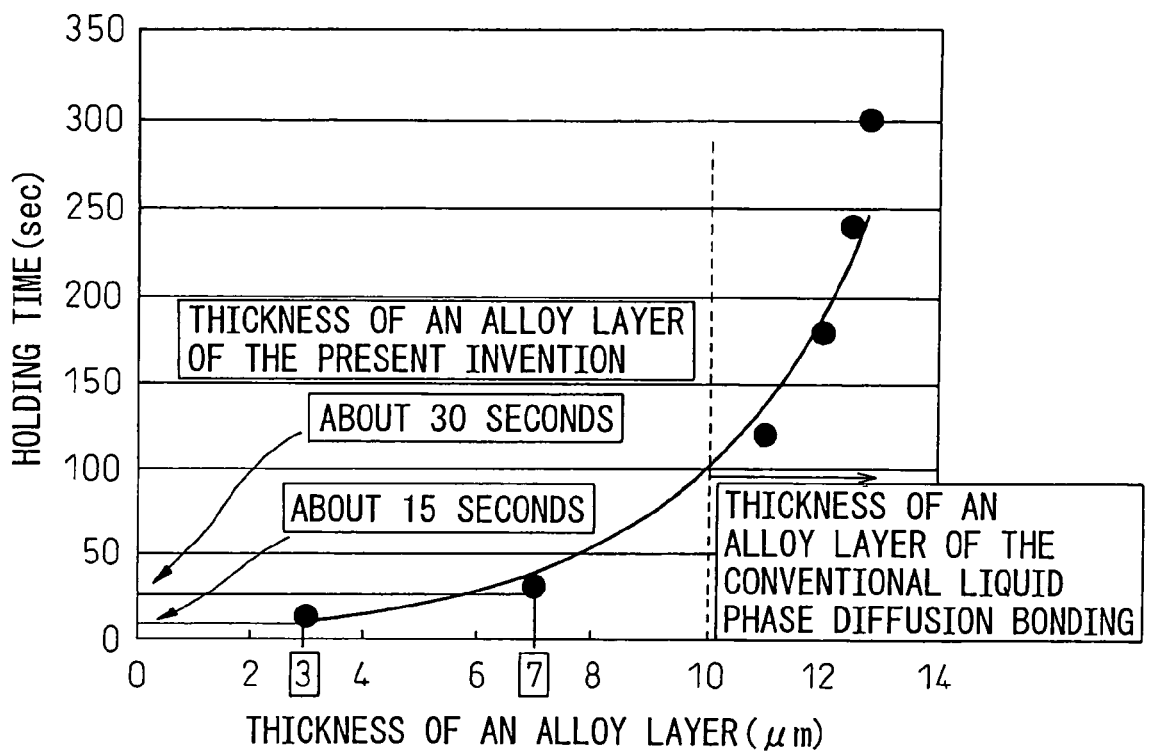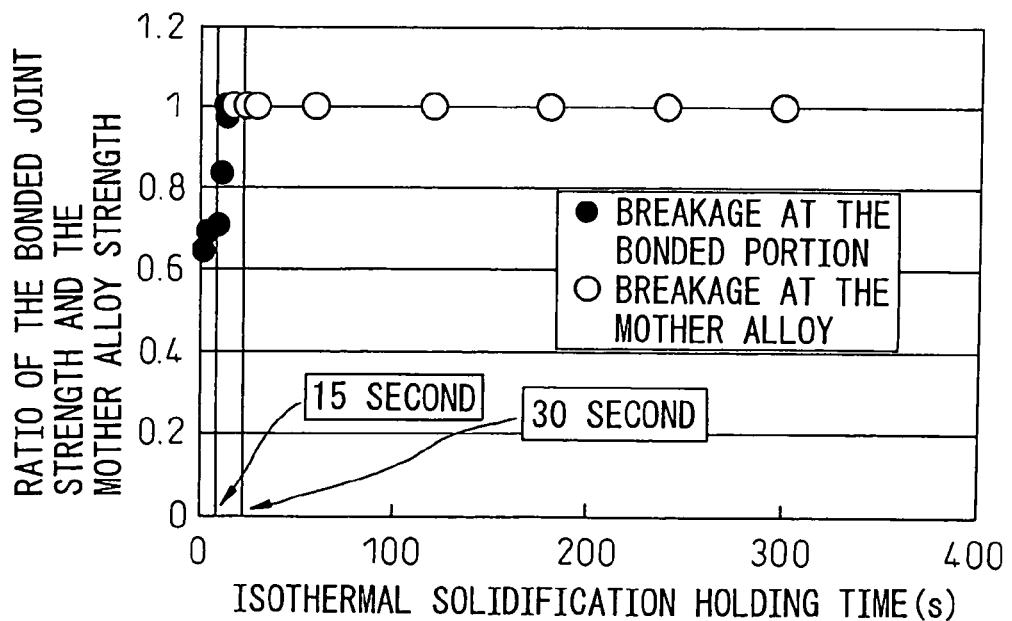

under pressure bonding conditions, the amorphous alloy foil is made to undergo diffusion bonding at a temperature lower than that.

LIQUID PHASE DIFFUSION BONDING METHOD OF METAL MACHINE PART AND SUCH METAL MACHINE PART

TECHNICAL FIELD

The present invention relates to a method of production of a metal machine part and to such a metal machine part, more particularly relates to liquid phase diffusion bonding method of a metal machine part used for an auto part etc. and to such a metal machine part.

BACKGROUND ART

In the past, as the methods of bonding metal materials with each other, welding methods had mainly been used. In recent years, however, use of the liquid phase diffusion bonding method as new industrial bonding technology for replacing this has been spreading.

The liquid phase diffusion bonding method is the technology of interposing between bonding faces of bonded materials, that is, the bevel faces, an amorphous alloy foil with a melting point lower than the bonded materials, specifically a multimetal alloy foil having at least 50% of its crystal structure amorphous, containing an element having the ability to form a bonded joint through a diffusion-limited isothermal solidification process, for example, B or P, and comprising a base material of Ni or Fe, then heating and holding the joint at a temperature of at least the melting point of this amorphous alloy foil so as to form a joint by an isothermal solidification process.

This liquid phase diffusion bonding method enables bonding with lower heat input compared with ordinary welding methods, so is characterized in that almost no residual stress of the weld occurs along with heat expansion and contraction and no excessive buildup of the weld such as with welding methods occurs, so the bond surface is smooth and a precision bonded joint can be formed.

In particular, since liquid phase diffusion bonding is facial bonding, the bonding time does not depend on the area of the bonding faces and is constant. Further, the bonding is completed in a relatively short time. From these viewpoints, this is bonding technology of a concept completely different from the conventional welding methods. Therefore, there is the advantage that if a joint can be held for a predetermined time at a temperature of at least the melting point of the amorphous alloy foil inserted between the bevel faces of the bonded materials, bonding between the surfaces can be realized without having to select the bevel shape.

The applicant has already proposed a method for producing a metal machine part provided with a pipeline inside it using this liquid phase diffusion bonding method in Japanese Unexamined Patent Publication (Kokai) No. 2003-181651 and Japanese Unexamined Patent Publication (Kokai) No. 2001-321963.

However, the liquid phase diffusion bonding disclosed in these patent publications enables the bonding time to be made a relatively short time, but the isothermal solidification proceeds limited by diffusion. In so far as this is the case, in order for diffusion atoms in the amorphous alloy foil to diffuse and disperse in an amount sufficient for raising the melting point of the joint, when using an amorphous alloy foil of a thickness of 10 μm, it is necessary to isothermally hold the foil at about 900 to 1300° C., corresponding to a temperature of at least the melting point of the alloy foil, for at least about 60 seconds.

By making the amorphous alloy foil used for the liquid phase diffusion bonding thinner, the bonding time can be shortened to a certain extent, but the effect of the precision of working of the bevel faces of the bonded materials on bonding defects and the deterioration of the joint strength becomes greater, so there are also limits to the reduction in thickness of the alloy foil. In actuality, the concentration of the diffusion atoms is raised in order to lower the melting point of the bonding foil or the chemical composition of the bonded materials is relied upon to induce melting of the parent material at the time of bonding. As a result, the actual thickness of the bonding alloy foil quite often exceeds 50 μm.

Further, even if raising the pressing stress in liquid phase diffusion bonding, while it is possible to shorten the bonding time to a certain extent, raising the pressing stress makes the bonded materials more susceptible to buckling deformation, so there are limits to increasing the pressing stress.

Accordingly, in the methods for producing metal machine parts using liquid phase diffusion bonding disclosed in Japanese Unexamined Patent Publication (Kokai) No. 2003-181651 and Japanese Unexamined Patent Publication (Kokai) No. 2001-321963, improving the productivity of the metal machine parts and reducing the production costs by shortening the bonding time while maintaining the joint quality in liquid phase diffusion bonding has become an issue in the industry.

On the other hand, electrical resistance welding is known as a bonding technique frequently used for bonding metal machine parts in the past.

Electrical resistance welding is a method of utilizing the heat of resistance produced by passing a current through metal, giving a large current to make the bevels of the bonded materials instantaneously melt, and pressing the bevels to form a bonded joint.

For example, when melt bonding a thermocouple to a measured object for measurement of its temperature, bonding steel plate to a frame member of an automobile, and in other cases where the relative bonding area is small and a high bonding strength is not required, spot welding, projection welding, upset welding, and other electrical resistance welding methods are frequently used as simplified bonding methods. Conversely, when bonding large bevels with relatively large bonding areas, flash pad welding and continuous electrical resistance welding able to apply a large current and a high pressing force are utilized—such as for seam welding of metal pipe.

However, when using these resistance welding methods to produce metal machine parts, sometimes fluctuations in the bonding conditions will cause for example bonding defects due to residual oxide-based inclusions at the bonds or insufficient welding current will cause so-called "cold welding" or welding defects due to insufficient melting. Further, the pressing at the time of bonding causes large deformation to occur, fine cracks occur at the welded parts, and the bevel ends remain unbonded, which become causes of a reduction in joint performance, particularly fatigue strength. In particular, when at least one bonded material is a cylindrical metal material, the drop in the joint fatigue strength tends to become remarkable. As measures against this, in the past, for example, changes in the material design or post-processing for improving the shape of the weld was required and there were problems such as the limitations on the freedom of the joint design, increase of costs, etc.

In addition to this, in resistance welding, sometimes the weld width is extremely narrow and bevel deformation occurs, so quality assurance by nondestructive testing was difficult. Due to this and other reasons, improvement of the bonding quality in resistance welding in bonding joints where reliability is particularly required is an issue in industrial technology.

Further, Japanese Unexamined Patent Publication (Kokai) No. 11-90619, Japanese Unexamined Patent Publication (Kokai) No. 11-90620, and Japanese Unexamined Patent Publication (Kokai) No. 11-90621 disclose a method and apparatus for bonding metal members making joint use of liquid phase diffusion bonding and conduction type resistance welding in the bonding of Al-based cylinder head members and Fe-based valve seats, but in each case the technique is just simple primary bonding resistance welding with the interposition of a brazing material.

That is, no isothermal solidification diffusion treatment is being performed to convert the incomplete isothermal solidification structures of the resistance welds occurring in primary bonding in the methods disclosed in the above patent publications to liquid phase diffusion bonding structures, so it is difficult to sufficient raise the quality of the bonds.

Further, in the above art, a brazing material is pressed out until becoming extremely thin. The steps up to this are treated as part of the production process. Therefore, homogenization of the bond structure is not being considered. Further, these disclosed art are technologies for forming joints for heterogeneous bonding of nonferrous metals such as Al. There is no description at all regarding the bonding of ferrous materials, in particular iron base materials. Of course, ordinary welding can be used for iron base materials and use of ordinary welding technology is difficult for bonding heterogeneous joints. Therefore, technology for bonding iron base materials is not described in the above patent publications.

DISCLOSURE OF THE INVENTION

The present invention considers the problems harbored by the above prior art and has as its object the provision of a liquid phase diffusion bonding method for a metal machine part enabling the bonding time to be shortened compared with the conventional liquid phase diffusion bonding method, achieving homogenization of the bonding structure and improvement of the tensile strength, fatigue strength, and other aspects of joint quality and reliability compared with the conventional resistance welding methods, and superior in the quality of the joint and the productivity and of a metal machine part assembled using the same.

The present invention was made to solve the above problems and has as its gist the following:

(1) A liquid phase diffusion bonding method of a metal machine part characterized by interposing an amorphous alloy foil for liquid phase diffusion bonding between bevel faces of metal materials, performing primary bonding by melt bonding said amorphous alloy foil and said metal material by resistance welding to form a joint, then performing secondary bonding by liquid phase diffusion bonding by reheating said joint to at least the melting point of said amorphous alloy foil, then holding it there to complete an isothermal solidification process of said joint.

(2) A liquid phase diffusion bonding method of a metal machine part as set forth in (1), characterized in that the holding time after said reheating is at least 30 seconds.

(3) A liquid phase diffusion bonding method of a metal machine part as set forth in (1) or (2), characterized in that the composition of said amorphous alloy foil is Ni or Fe as a base and, as diffusion atoms, one or more of B, P, and C in amounts of 0.1 to 20.0 at % and further V in 0.1 to 10.0 at %.

(4) A liquid phase diffusion bonding method of a metal machine part as set forth in any one of (1) to (3), characterized in that said resistance welding is one type of welding method from among conduction heating type spot welding, projection welding, upset welding, and flash pad welding and in that a time of melt bonding said amorphous alloy foil and said metal material by said resistance welding is not more than 10 seconds.

(5) A liquid phase diffusion bonding method of a metal machine part as set forth in any one of (1) to (4), characterized in that an amount of current in said resistance welding is 100 to 100,000 A/mm$^2$.

(6) A liquid phase diffusion bonding method of a metal machine part as set forth in any one of (1) to (5), characterized in that a pressing force in melt bonding of said amorphous alloy foil and said metal material by said resistance welding is 10 to 1,000 MPa.

(7) A liquid phase diffusion bonding method of a metal machine part as set forth in any one of (1) to (6), characterized in that a thickness in a pressing direction of an incomplete isothermally solidification structure in a cross-sectional structure of a joint formed by said resistance welding is on an average not more than 10 μm.

(8) A liquid phase diffusion bonding method of a metal machine part as set forth in any one of (1) to (7), characterized in that a joint efficiency of a joint formed by said resistance welding is 0.5 to 2.0.

where, the "joint efficiency" is the ratio of the area of the bevel faces of the metal materials to the area of the joint after melt bonding the amorphous alloy foil and metal materials (9) A liquid phase diffusion bonding method of a metal machine part as set forth in any one of (1) to (8), characterized by cooling said joint after the end of an isothermal solidification process by a cooling rate of 0.1 to 50° C./sec to control the joint structure.

(10) A metal machine part comprised of a joint formed by liquid phase diffusion bonding of metal materials, said metal machine part characterized in that a maximum grain size of prior γ phase in a metal structure of the metal machine part as bonded is not more than 500 μm.

(11) A liquid phase diffusion bonding method of a metal machine part as set forth in any one of (1)-(9), characterized in that at least one of said metal materials is a cylindrical metal material and in that a V-bevel is formed at an end of said cylindrical metal material so that, when bringing the end of said cylindrical metal material into abutment with the surface of another metal material for primary bonding, an inner surface bevel height A and an outer surface bevel height B of said cylindrical metal material with respect to the abutting contact point and a distance C from said abutting contact point to the outer circumference satisfy the following relation (1):

$$0.2 \leq B/A \leq 1 \text{ and } C/t \leq 0.5 \qquad (1)$$

where A is an inner surface bevel height of said cylindrical metal material, B is an outer surface bevel height of said cylindrical metal material, C is a distance from an abutting contact point of the cylindrical metal material to the outer circumference, and t is the thickness of the cylindrical metal material.

(12) A liquid phase diffusion bonding method of a metal machine part as set forth in (11), characterized in that a maximum residual height of the bevel ends after said primary bonding is not more than three times the thickness of said amorphous alloy foil.

(13) A liquid phase diffusion bonding method of a metal machine part as set forth in (11) or (12), characterized in that a joint efficiency after said primary bonding is at least 0.8.

(14) A liquid phase diffusion bonding method of a metal machine part as set forth in any one of (11) to (13), characterized in that a maximum residual height of the bevel ends after said secondary bonding is not more than 70 μm.

BRIEF DESCRIPTION OF THE DRAWINGS

FIG. 1 is a view of the relationship between the thickness of an alloy layer formed by the melting and solidification of an amorphous alloy foil for liquid phase diffusion bonding and the holding time until the isothermal solidification of the alloy layer ends.

FIG. 2 is a view of the relationship between the isothermal solidification holding time and bonded joint strength in secondary bonding (liquid phase diffusion bonding) of the method of the present invention.

BEST MODE FOR WORKING THE INVENTION

Figure 3:
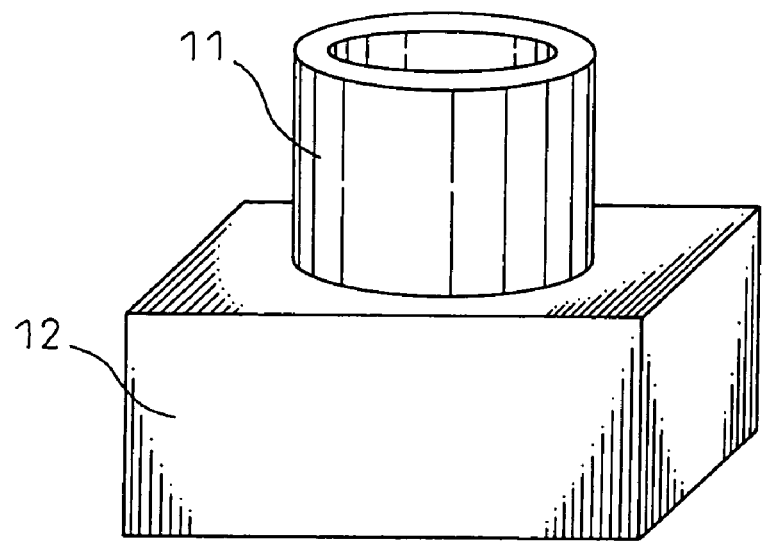
FIG. 3 is a perspective view of an embodiment in the case of butt bonding a cylindrical metal material and another metal material.

Below, details of the present invention will be explained.

The method of the present invention uses metal materials as the bonded materials, brings them into abutment while interposing an amorphous alloy foil for liquid phase diffusion bonding between the bevel faces formed at the end of a metal material, and performs primary bonding by melt bonding said amorphous alloy foil and said metal materials by resistance welding to form a joint.

In this primary bonding, for example, a resistance welding system arranging at the bonded materials electrodes for supplying a welding current to the bevel faces (abutting faces) of the bonded materials to heat and melt them and using a stress applying mechanism to apply the stress required for press bonding between the bevel faces, for example, an oil pressure actuated Instron type tension/compression system, is used.

In this primary bonding, the welding heat input of the resistance welding melts the bevel faces of the bonded materials and the liquid phase diffusion bonding alloy foil. The oxides upset by the pressing stress and produced at the time of heating and melting and the inclusions present at the bevel faces are discharged from the bonding faces together with the molten metal.

Further, in the primary bonding, the amorphous alloy foil for liquid phase diffusion bonding inserted between the bevel faces of the bonded materials has a lower melting point compared with the ferrous materials of the bonded materials. An amorphous alloy foil having a structure in which at least 50% of the volume of the foil is amorphous is used.

By interposing between the bevel faces of the bonded materials a liquid phase diffusion bonding alloy foil with a melting point of about 900 to 1200° C. or lower than the bonded materials and melt bonding by resistance welding, there are the effects that the liquid phase diffusion bonding alloy foil is uniformly melted between the bevel faces and, at the same time, the oxides produced at the time of heating and melting and the inclusions which had been left at the bevel faces are discharged from the bonding faces together with the molten metal.

Note that the amorphous alloy foil for liquid phase diffusion bonding in the present invention is comprised of Ni or Fe as a base material, contains as diffusion atoms one or more of B, P, and C in amounts of 0.1 to 20.0 at % each, and further contains V having the action of lowering the melting point of the oxides produced between the bonding faces at the time of primary bonding in an amount of 0.1 to 10.0 at %.

The B, P, and C in the liquid phase diffusion bonding alloy foil are elements required as diffusion elements for realizing the isothermal solidification required for achieving the liquid phase diffusion bonding of the secondary bonding or for lowering the melting point from the bonded members. To sufficiently obtain this action, they must be contained in amounts of at least 0.1 at %, but if excessively added, coarse borides, metal compounds, or carbides will be produced in the crystal grains and the strength of the bond will fall, so the upper limit is preferably made 20.0 at %.

The V in the liquid phase diffusion bonding alloy foil has the action of reacting instantaneously with the oxide produced between the bevel faces at the time of the resistance welding of the primary bonding or the residual oxide ($Fe_2O_3$) and changing them to a low melting point complex oxide ($V_2O_5$—$Fe_2O_3$, melting point: not more than about 800° C.) and gives the effect of melting and discharging the low melting point complex oxide along with the molten metal by the pressing stress at the time of the resistance welding and reducing the oxide-based inclusions of the bond. To sufficiently obtain this action and effect, V is preferably included in an amount of at least 0.1 at %. On the other hand, if excessively adding V in an amount over 10.0 at %, the number of the V-based oxide particles will increase and the residual oxide will conversely increase. Further, the melting point of the liquid phase diffusion bonding alloy will be raised and liquid phase diffusion bonding of the secondary bonding will be made difficult. Therefore, the upper limit is preferably made 10.0 at %.

Further, the resistance welding able to be used as the primary bonding in the present invention may be any welding method from among conduction heating type spot welding, projection welding, upset welding, and flash pad welding. Normally, spot welding, projection welding, and upset welding are suited for bonding in cases where the bonding area is relatively small and a high bonding strength is not required, while flash pad welding enables a large current and high pressing force to be applied, so is suited to the case of bonding bevels of relatively large bonding areas. The selection of the resistance welding method does not particularly have to be limited. It is preferable to suitably select it in accordance with the features of the different welding methods, the required properties of the bonded joint, the welding conditions, etc. and to make the welding time not more than 10 seconds so as to improve productivity.

Further, in order for the welding heat input for the resistance welding in the primary bonding to melt the amorphous alloy for the liquid phase diffusion bonding between one bevel face and the other bevel face in a short time, the current density must be made at least 100 A/mm$^2$. On the other hand, if the current density is raised excessively, the molten metal of the amorphous alloy foil will become disturbed and distributing it uniformly over the bevel faces by a predetermined thickness will become difficult, so the upper limit has to be made not more than 100,000 A/mm$^2$. Therefore, it is preferable to make the current density of the resistance welding from 100 to 100,000 A/mm$^2$.

Further, the pressing stress of the resistance welding in the primary bonding has to be at least 10 MPa in order to reduce the thickness of the bonding alloy layer formed by melting and solidifying the amorphous alloy foil for liquid phase diffusion bonding between the bevel faces and shorten the bonding time of the liquid phase diffusion bonding of the secondary bonding. On the other hand, if the pressing stress is excessively high, deformation of the bonded joint occurs, so it has to be made not more than 1000 MPa. Therefore, the pressing stress of the resistance welding is preferably made 10 to 1,000 MPa. Note that the extent of deformation of the bonded joint differs depending on the Young's modulus of the bonded materials at the welding temperature, so the upper limit of the pressing stress is preferably one adjusted by the properties of the bonded materials.

Further, the joint efficiency of the joint formed by the resistance welding at the primary bonding (area of bevel faces of ferrous metal/area of joint after melt bonding amorphous alloy foil and ferrous metal) has to be at least 0.5 taking into consideration the joint constraint effect after bonding due to the shape of the bevels and to secure a static tensile strength of the joint of a tensile strength of at least the level of the parent materials. Further, the high pressing stress at the time of resistance welding causes the joint to swell. As a result, the joint area becomes broader than the sectional area of the parent materials. Considering this, to obtain good joint properties, the upper limit is preferably made 2.0.

By melt bonding by the primary bonding shown above the amorphous alloy foil for liquid phase diffusion bonding inserted between the bevel faces of the bonded materials in a short time, it is possible to form a bonding alloy layer of an extremely thin thickness formed by the melting and solidification of the amorphous alloy foil. The inventors conducted experiments by which they confirmed from the results of examination of the joint cross-sectional structure by optical microscope that the thickness of the bonding alloy layer comprised of a structure formed by the melting and solidification of the amorphous alloy foil obtained by the primary bonding was a maximum of not more than 7 μm and was an average of not more than 3 μm.

The bonding alloy layer formed by the melting and solidification of the extremely thin amorphous alloy foil for liquid phase diffusion bonding in this way substantially finishes being isothermal solidification in the subsequent liquid phase diffusion bonding of the secondary bonding by holding it at a temperature of at least the melting point of the amorphous alloy foil for about 15 seconds. If holding it for about 30 seconds, when using ordinary carbon steel as the bonded materials, it was confirmed by estimation by diffusion formula and experiments that a complete isothermal solidification structure is obtained.

FIG. 1 is a view of the relationship between the thickness of the alloy layer formed by the melting and solidification of the amorphous alloy foil for liquid phase diffusion bonding (in the case of the method of the present invention, the alloy layer after the primary bonding and in the case of the conventional method, the alloy layer after press bonding) and the holding time until the isothermal solidification of the alloy layer ends (holding time until incomplete isothermal solidification structure can no longer be observed).

In the conventional liquid phase diffusion bonding method, the thickness of the alloy layer formed by the melting and solidification of the amorphous alloy foil for liquid phase diffusion bonding can be reduced to a certain extent by increasing the pressing force, but an increase in the pressing force causes joint deformation to occur, so as shown in FIG. 1, making the thickness of the alloy layer thinner to not more than 10 μm is difficult. The holding time until the isothermal solidification of the liquid phase diffusion bonding ended had to be at least 100 seconds. If making the isothermal solidification holding time in the prior art method less than 100 seconds, the problem arose that an incomplete isothermal solidification structure of the amorphous alloy foil end up remaining and the strength, toughness, and other properties of the joint ended up becoming remarkably lower compared with the parent materials.

As opposed to this, with the method of the present invention, primary bonding (resistance welding) enables the average thickness of the bonding alloy layer produced by the melting and solidification of the amorphous alloy foil for liquid phase diffusion bonding to be reduced to not more than 7 μm, while the following secondary bonding (liquid phase diffusion bonding) enables the holding time until the isothermal solidification of the liquid phase diffusion bonding ends (until incomplete isothermal solidification structure of bonding alloy layer completely disappears) to be shortened to not more than 30 seconds. Experiments by the inventors, as shown in the figures, confirmed that the average thickness of the bonding alloy layer can be reduced to 3 μm by the primary bonding (resistance welding). In this case, it is possible to expect the isothermal solidification to be completed (incomplete isothermal solidification structure of bonding alloy layer to completely disappear) by a holding time of 15 seconds by the secondary bonding (liquid phase diffusion bonding). Due to the above, by the method of the present invention, it is possible to greatly shorten the bonding time and to expect an improvement in productivity while maintaining the joint quality at least equal to the conventional liquid phase diffusion bonding.

FIG. 2 is a view of the relationship between the isothermal solidification holding time in the secondary bonding (liquid phase diffusion bonding) of the method of the present invention and the bonded joint strength.

Note that the bonded joint strength is shown by the ratio of the tensile strength of the bonded joint to the tensile strength of the parent materials in the case of conducting a tensile test in the direction pulling the joint from the bonding faces. If the value is 1, this means that the parent material breaks, while if less than 1, it means that the joint breaks.

In actual bonding, the thickness of the bonding alloy layer produced by the melting and solidification of the amorphous alloy foil for liquid phase diffusion bonding formed between the bevel faces by the primary bonding (resistance welding) of the present invention varies depending on the position of the bevel faces, but from FIG. 2, by making the isothermal solidification holding time in the secondary bonding (liquid phase diffusion bonding) at least 30 seconds, a tensile test of the joint results in the parent material breaking and therefore a good joint strength of at least the tensile strength of the parent material is obtained.

In the method of the present invention, based on the above experimental findings, to secure a joint strength of at least equal to the conventional liquid phase diffusion bonding method, it is preferable to make the isothermal solidification holding time of the secondary bonding (liquid phase diffusion bonding) at least 30 seconds.

Note that the isothermal solidification holding time of the secondary bonding (liquid phase diffusion bonding) can give a predetermined joint strength stably along with its increase, but if the isothermal solidification holding time is excessively increased, the old γ-crystal grain size of the metal structure of the joint will become coarser and the toughness of the joint will fall, so the upper limit is preferably made not more than 100 seconds.

In the present invention, after the secondary bonding, that is, after the end of the isothermal solidification of the liquid phase diffusion bonding, by controlling the cooling rate in accordance with the type of the steel of the bonded materials, a desired metal structure, for example, if a carbon steel, ferrite+pearlite, ferrite, bainite, martensite, or other metal structure is obtained or, if austenite steel, a bonded joint is obtained with a good metal structure due to the action of re-solution of precipitates and other inclusions occurring at the time of bonding.

In the present invention, in order to secure the minimum low temperature transformation structure (bainite or martensite) ratio required for improving the strength and toughness of the joint required for a machine part for an automobile, it is preferable to make the cooling rate after the secondary bonding, that is, after the end of the isothermal solidification of the liquid phase diffusion bonding, at least 0.1° C./sec. Excessive cooling becomes a cause of a reduction in the toughness and ductility, so the upper limit of the cooling rate is preferably made 50° C./sec. By controlling the cooling rate, it is possible to form a sound, high affinity joint between ferrite steels, austenite steels, or ferrite steel and austenite steel.

Note that in the method of the present invention, after the above cooling and for the purpose of thermally refining the metal structure, it is possible to reheat and perform quenching, tempering, quenching and tempering, and other heat treatment alone or repeated a plurality of times or in combination. In this case, the joint structure is made more homogeneous and the effect of the present invention can be further raised.

Note that with a material with an aversion to retained austenite, deep cooling is also effective. Deformation due to ageing can be suppressed.

According to the embodiments of the present invention shown above, it is possible to reduce the amount of deformation of a joint compared with the conventional resistance welding methods alone. Further, when assembling metal machine parts etc., the invention can be applied to machine parts of shapes unable to be processed even when utilizing boring, lathing, cutting, and other machining, machine parts including heterogeneous welded joints of difficult to weld materials hard to combine, and machine parts where the material cost would rise tremendously due to cutting and therefore an improvement of productivity and further a reduction of costs and other effects can be simultaneously achieved. Further, according to the embodiments of the present invention, even in the case where small cracks occur in the bonding faces after the primary bonding (resistance welding), the subsequent secondary bonding (liquid phase diffusion bonding) causes the unmelted amorphous alloy foil to further melt and flow into the cracks to thereby enable the fine cracks to be repaired. Further, the alloy layer comprised of the incomplete isothermal solidification structure is changed to a complete isothermal solidification structure. Due to these effects, it is possible to obtain a joint higher in joint strength, fatigue strength, etc. and superior in quality compared with the conventional resistance welding methods.

Further, according to the embodiments of the invention, it is possible to greatly shorten the isothermal solidification holding time of the amorphous alloy foil, that is, the time for holding the bonded joint at a reheating temperature of at least the melting point of the amorphous alloy foil, while maintaining a joint quality at least the same as the conventional liquid phase diffusion bonding method alone. As a result, the metal machine part comprised of a joint formed by liquid phase diffusion bonding with a ferrous metal material assembled according to the method of the present invention can be given a maximum grain size of the prior γ phase in the metal structure as bonded of a small size of not more than 500 μm and can be improved in toughness compared with a joint obtained by the conventional liquid phase diffusion bonding method (where the crystal grain size is over a maximum grain size of 1 mm).

Further, at the time of secondary bonding (liquid phase diffusion bonding) in the embodiment of the present invention, since it is possible not to apply pressure to the bonding faces as required at the time of liquid phase diffusion bonding alone or to reduce the pressing force, it becomes possible to obtain a good liquid phase diffusion bond with just a simple pressing system. Therefore, according to the method of the present invention, it becomes possible to realize liquid phase diffusion bonding free from weld defects and superior in bond quality at a low cost without requiring sophisticated pressing technology such as pressing the bonding faces uniformly at a high temperature.

Therefore, in metal machine parts assembled by the conventional liquid phase diffusion bonding, it becomes possible to simplify the QT and other heat treatment required for improving the joint toughness and improve the productivity and reduce the production cost.

According to the embodiments of the invention explained above, it is possible to produce bonded joints of metal materials at a higher quality and higher productivity compared with the conventional bonding methods such as resistance welding methods alone and liquid phase diffusion bonding methods. However, as shown in FIG. 3, when at least one of the metal materials of the bonded materials is a cylindrical metal material 11, when bringing its end into abutment with the other metal material 12 and bonding them by primary bonding (resistance welding), the following problems are anticipated. Therefore, to stably achieve the effects of the present invention and stably improve the joint quality of the fatigue strength etc., it is preferable to use the embodiments explained below.

Figure 4:
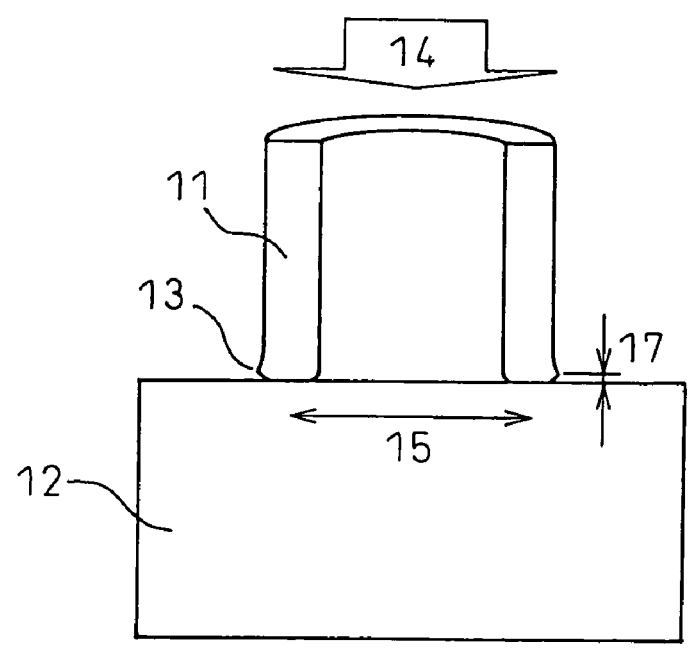
FIG. 4 is a cross-sectional view of a bevel at the time of primary bonding of a cylindrical metal material and another metal material.

That is, when bringing the cylindrical metal material 11 into abutment with the metal material 12 and bonding them by primary bonding (resistance welding), as shown in FIG. 4 (cross-sectional view of FIG. 3), the pressing force 14 and thermal stress of the primary bonding cause the bevel parts of the cylindrical metal material 11 to flare outward in the outer surface side direction 15 and therefore a bevel end 13 of the outer surface side of the cylindrical metal material 11 after the primary bonding is easily left with a notch shaped groove. In the present invention, due to the secondary bonding (liquid phase diffusion bonding) performed after the end of the primary bonding, the unmelted amorphous alloy foil is further melted and made to flow into the residual notch shaped groove. However, if the maximum residual height 17 of the bevel end becomes too large after the primary bonding, even with subsequent secondary bonding, it becomes difficult to obtain a flat bond. The notch tip of the residual groove becomes a site of stress concentration and becomes a cause of a reduction in the joint properties, in particular the fatigue strength, so this is not preferable.

In the present invention, to solve the above problems in the case of primary bonding (resistance welding) of at least one cylindrical metal material and improve the joint properties more stably, the following conditions are preferably defined.

Figure 5:
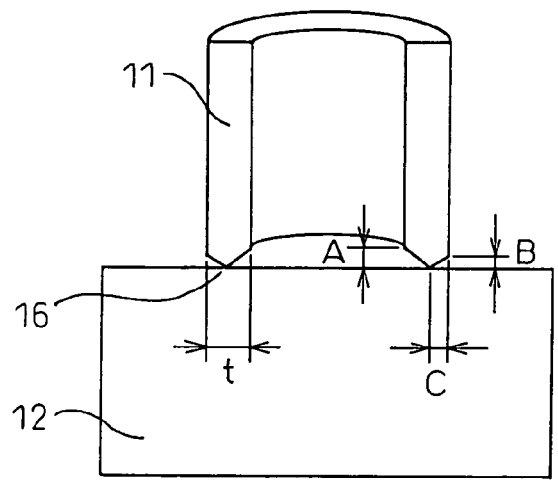
FIG. 5 is a cross-sectional view of a bevel running along a center axis of a steel pipe and vertical to the bonding faces before bonding metal machine parts.

FIG. 5 is a cross-sectional view of the bevel for explaining the relationship among the inner surface bevel height A and outer surface bevel height B of the cylindrical metal material with respect to the abutting contact point, the distance C from the abutting contact point to the outer circumference, and the thickness t of the cylindrical metal material 11 at the time of bringing the end of the cylindrical metal material 1 and the surface of the other metal material into abutment. Note that the cross-sectional direction of this figure runs along the center axis of the cylindrical metal material 11 and is vertical to the bonding faces.

In the present invention, to keep the bevel of the cylindrical metal material 11 from flaring out in the outer surface side direction 15 due to the pressing force 14 and thermal stress as shown in FIG. 4 at the time of primary bonding of the cylindrical metal material 11 and to reduce the metal material 12 and the maximum residual height 17 of the bevel end after the primary bonding, it is preferable to make the relationship among the inner surface bevel height A and outer surface bevel height B of the cylindrical metal material with respect to the abutting contact point 16, the distance C from the abutting contact point 16 to the outer circumference, and the thickness t of the cylindrical metal material 11 shown in FIG. 5 a suitable condition.

Figure 6:
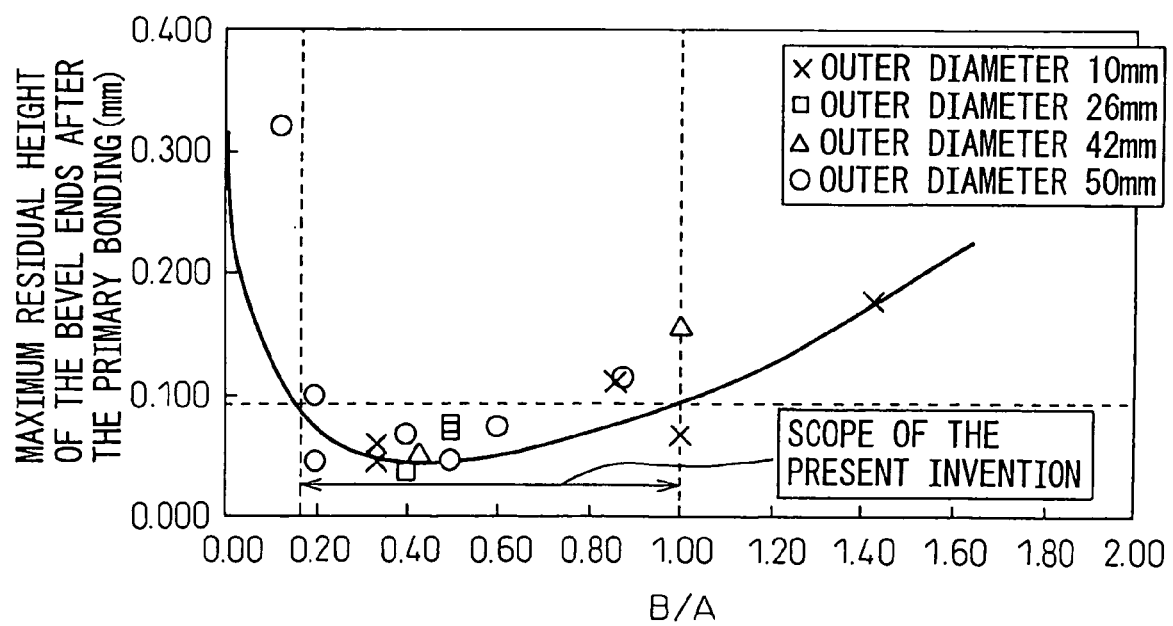
FIG. 6 is a view of the relationship between a ratio (B/A) of the outer surface bevel height B to the inner surface bevel height A of a cylindrical metal material before primary bonding and the maximum residual height of the bevel ends after the primary bonding.

FIG. 6 shows the relationship between the ratio of the outer surface bevel height B to the inner surface bevel height A of the cylindrical metal material before primary bonding (in the state not pressed), that is, B/A, and the maximum residual height 17 of the bevel end after the primary bonding. Note that the ratio of the distance C from the abutting contact point 16 to the outer circumference to the thickness t of the cylindrical metal material 11, that is, C/t, was made 0.5.

Under conditions where the value of B/A is 0.2 to 1, it is learned that the maximum residual height after the primary bonding can be sufficiently reduced. On the other hand, if the value of B/A becomes less than 0.2, the residual height of the inner surface bevel end of the cylindrical metal material 11 becomes larger. Further, if the value of B/A exceeds 1, the residual height of the outer surface bevel end of the cylindrical metal material 11 will become larger. In both cases, the maximum residual height of the bevel end after primary bonding will become higher than 0.1 mm. In this case, it will become difficult to sufficiently reduce the residual groove of the joint even by the repair action of the residual groove by the secondary bonding (liquid phase diffusion bonding) performed after the primary bonding, so this is not preferred.

Further, FIG. 6 shows the results when the value of the ratio of the distance C from the abutting contact point 16 to the outer circumference with respect to the thickness t of the cylindrical metal material 11, that is, C/t, is 0.5. Under conditions where the value of C/t becomes smaller than 0.5 or less, if a pressing force 14 is applied at the time of the primary bonding as shown in FIG. 4, the bevel ends of the cylindrical metal material 11 will receive stress in the outer surface direction 15 and the outer surface bevel end will more easily deform, so the maximum residual height of the bevel end after the primary bonding will be reduced more. However, when the value of C/t becomes larger than 0.5, if a pressing force 14 is applied at the time of the primary bonding, the inner surface bevel end of the cylindrical metal material 11 will more easily deform. Even under conditions where the value of B/A is 0.2 to 1, it will no longer be possible to reduce the maximum residual height of the bevel end after the primary bonding to not more than 0.1 mm, so this is not preferable.

Based on the above discovery, in the present invention, when at least one of said metal materials is a cylindrical metal material, when bringing the end of said cylindrical metal material into abutment with the surface of the other metal material for primary bonding (resistance welding), it is preferable to form a V-bevel at the end of the cylindrical metal material so that an inner surface bevel height A and an outer surface bevel height B of said cylindrical metal material with respect to the abutting contact point and a distance C from said abutting contact point to the outer circumference satisfy the following relation (1):

$$0.2 \leq B/A \leq 1 \text{ and } C/t \leq 0.5 \tag{1}$$

Further, in the embodiments of the present invention, the maximum residual height 17 of the bevel end of the cylindrical metal material 11 after the primary bonding (resistance welding) shown in FIG. 4 is preferably as low as possible so that the unbonded residual part of the bevel end can be sufficiently reduced and the fatigue strength of the joint can be more stably improved by the melting and repair action of unmelted amorphous alloy foil at the time of the secondary bonding (liquid phase diffusion bonding) performed after that. When exceeding three times the thickness of the amorphous alloy foil, it becomes difficult to more stably improve the fatigue strength of the joint even by the melting and repair action of the unmelted amorphous alloy foil of the secondary bonding.

Therefore, in the above embodiments of the present invention, considering the melting and repair action and effect of the unmelted amorphous alloy foil of the secondary bonding, the maximum residual height of the bevel end after the primary bonding is preferably made not more than 3 times the thickness of the amorphous alloy foil.

Further, in the embodiments of the present invention, when the pressing force 14 or the welding current at the time of the primary bonding (resistance welding) is low or the conditions are otherwise unsuitable as shown in FIG. 4, even if the maximum residual height of the bevel end after the primary bonding (resistance welding) of the cylindrical metal material 11 is in the above suitable range, it will not be possible to uniformly form a bonding alloy layer formed by the melting and solidification of the amorphous alloy foil between the bevel faces after the primary bonding. Even if the area near the abutting contact point is press bonded, the press bonding between the bevel faces will become insufficient. Further, due to the effects of the residual stress occurring due to the outer surface direction stress of the cylindrical metal material 11 at the time of primary bonding (resistance welding), there is also the possibility that the bonding alloy layer will end up peeling off before the secondary bonding.

To suppress these problems and form a uniform bonding alloy layer between the bevel faces after the primary bonding and form a bonding alloy layer with a good adhesion not peeling off before the secondary bonding, in the embodiments of the present invention, it is preferable to make the joint efficiency after the primary bonding at least 0.8.

Further, in the embodiments of the present invention, the maximum residual height of the bevel ends after secondary bonding is preferably as low as possible so as to further improve the joint fatigue strength without using post-processing for improving the shape of the bevel ends.

In the embodiments of the present invention, due to the melting and repair action of the unmelted amorphous alloy foil at the time of the secondary bonding, the bonds can be made flat, but to further improve the fatigue strength of the joints, it is preferable to make the maximum residual height of the bevel ends after secondary bonding not more than 70 μm.

EXAMPLES

The effects of the present invention will be explained by the following examples.

Example 1

Amorphous alloy foils for liquid phase diffusion bonding having the three types of chemical compositions of the symbols A to C and melting points shown in Table 1 and bonded materials comprised of ferrous metals, Ni alloys, or Ti alloys having the chemical compositions of the symbols a to f shown in Table 2 were used to produce metal machine parts under the bonding conditions shown in Table 3 and Table 4.

The metal machine parts obtained were subjected to tensile tests in the direction pulling away from the bonded surfaces and charpy impact tests of the bonds at 0° C. and were evaluated for joint strength and joint toughness. Further, the amounts of deformation of the metal machine parts in the direction of application of bonding stress were measured and the amounts of deformation evaluated. The results are shown in Table 3 and Table 4.

Note that in Table 3 and Table 4, the evaluation of the joint strength is shown by the ratio of the tensile strength of the bonded joint with respect to the tensile strength of the parent material. If the value is 1, this means that the parent material breaks, while if less than 1, it means that the joint breaks. Further, the evaluation of the joint toughness is "good" when the absorbed energy at 0° C. is 21 J or more and "poor" when it is less than 21 J.

Figure 7:
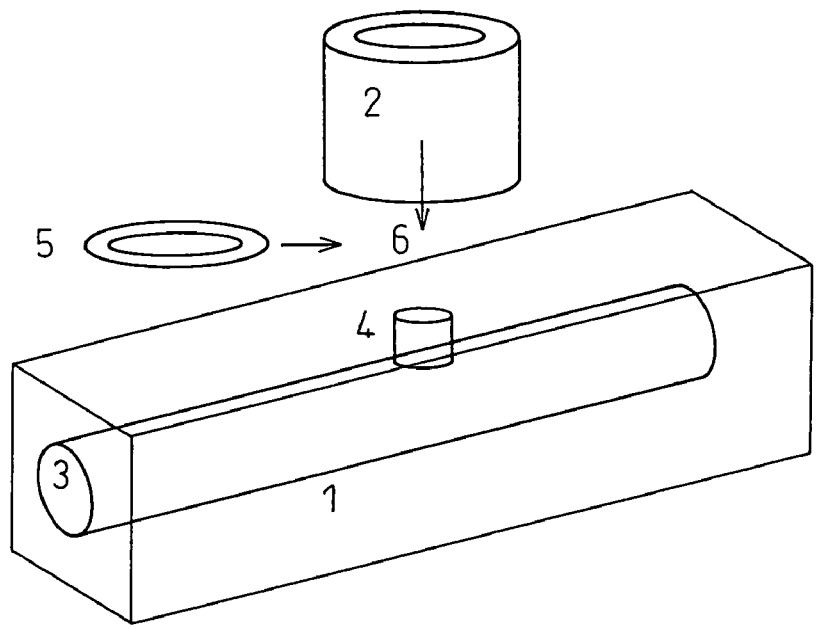
FIG. 7 is a view of an embodiment in the case of welding a rectangular pipe and a branch pipe to produce a metal machine part.
Figure 8:
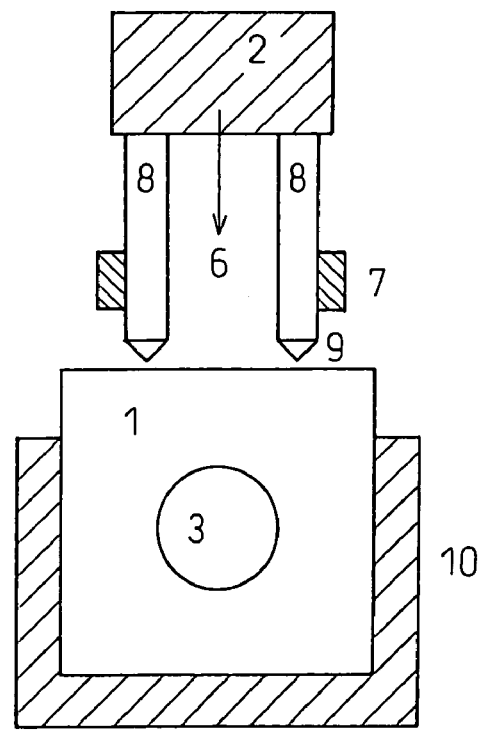
FIG. 8 is a cross-sectional perspective view of a rectangular pipe from the inside pipeline axial direction at the time of assembly in FIG. 7.

Note that Nos. 2 to 8 shown in Table 3 are examples of production of metal machine parts by the following procedure. FIG. 7 and FIG. 8 are schematic views for explaining examples in the case of bonding a branch pipe 2 to a branch opening 4 of a rectangular pipe body 1 at the center in the longitudinal direction of the internal pipeline 3 so as to produce an automobile use metal machine part having a T-branch pipe inside. Note that FIG. 7 is a perspective view of a metal machine part for an automobile, while FIG. 8 is a cross-sectional view running along a center axis of the passage 2 and vertical to the center axis of the internal pipeline 3.

As shown in FIG. 7, the end of the branch pipe 2 forming one bonding face was machined in advance to give a V-bevel having an angle of 45°. The bonding faces of the bevel 9 of the branch pipe 2 and the pipe body 1 were made to abut against each other through a ring-shaped liquid phase diffusion bonding alloy foil 5, then electrodes 7 and 10 brought into close contact with the branch pipe 2 and the pipe body 1 were used to run a DC current through the bevel parts. At the same time, a pressing stress 24 was applied in the direction of 6. Note that the pressing stress was applied through a stress transmitting plate (not shown) operating by oil pressure from above the branch pipe 2. As a result, the bevel 9 of the branch pipe 2 collapsed under the pressure and deformed to the same thickness as the thickness 8 of the branch pipe 2. Further, the liquid phase diffusion bonding alloy foil 5 interposed between the bevels of the branch pipe 2 and the pipe body 1 formed an alloy layer after melting once, then solidifying, but the bonding time wa extremely short, so the result was an incomplete isothermal solidification structure with an average thickness of less than 3 μm, that is a so-called "brazed structure" where the diffusion-limited isothermal solidification was not ended. Next, as secondary bonding, the bonded joint was raised to the reheating temperature of 150° C. by an electric furnace having a high frequency induction heating coil and resistance heat generating element and held there for a predetermined time, whereby the diffusion-limited isothermal solidification of the bonding alloy layer formed in the primary bonding was ended, then the joint was cooled.

Further, Nos. 1 and 9 shown in Table 3 are examples of production of metal machine parts by the following procedure.

As the bonded materials, two rods of diameters of 5 mm and lengths of 50 mm were used. The bevel end faces were made completely I-shapes and were ground to bevel face roughnesses Rmax of not more than 10 μm. Alloy foils for liquid phase diffusion bonding having diameters of 5 mm were interposed between these bevels, then the bonded materials were run through with DC current and simultaneously given a pressing stress for resistance welding as primary bonding to form joints. The absence of any offset in coaxiality of the rods was confirmed, then the now 100 mm long joints were raised in temperature to the reheating temperature in an electric furnace having a resistance heat generating element, then held there and then cooled as secondary bonding. There was no subsequent heat treatment at all.

Note that Nos. 10 and 11 shown in Table 4 are comparative examples where no secondary bonding (liquid phase diffusion bonding) was performed when producing the above metal machine parts, while Nos. 12 and 13 are comparative examples where no primary bonding (resistance welding) was performed when producing the above metal machine parts. Further, No. 14 shown in Table 4 is a comparative example where primary bonding (resistance welding) and secondary bonding (liquid phase diffusion bonding) were performed when producing the above metal machine part, but the bonding conditions were outside of the scope of the present invention.

From the results shown in Table 3, Nos. 1 to 9 of production of metal machine parts under bonding conditions within the scope of the present invention by the bonding method of the present invention all had joint strengths exceeding the tensile strengths of the parent materials and had amounts of deformation in the direction of application of the bonding stress of not more than 5% or satisfactory in terms of performance in use as machine parts. Further, the holding times of the liquid phase diffusion bonding were short, so the maximum crystal grain sizes of the joints were fine sizes of not more than 500 μm and the joint toughnesses were also excellent.

Nos. 10 to 14 shown in Table 4 are all comparative examples outside of the scope of the bonding conditions of the method of the present invention. Nos. 10 and 11 are comparative examples in the case of using only resistance welding. In this case, No. 10 had an amorphous alloy foil for liquid phase diffusion bonding interposed, but its structure was an incomplete isothermal solidification structure, that is, a brazed structure, so the joint strength was lower than the parent material strength, the value of the evaluation was lower than the standard 1, and the joint broke. In particular, No. 11 involved only resistance welding with no use of any amorphous alloy foil for liquid phase diffusion bonding, so inclusions and defects remained at the bonding interface and the joint strength fell. With normal resistance welding, sometimes such unstable joint strength results. These defects could not substantially be detected.

Further, Nos. 12 and 13 are comparative examples where bonding was performed by applying bonding stress of 5 MPa only at the liquid phase diffusion bonding. In the comparative example of No. 12, the holding time was a short 40 seconds. The crystal grains of the joint could be made small, but the liquid phase diffusion bonding was not completed at all and therefore the joint strength fell. The comparative example of No. 13 had the holding time of the liquid phase diffusion bonding made longer to make up for the elimination of addition of resistance welding. Therefore, the joint strength was improved, but the crystal grains of the metal structure became coarser. Therefore, the absorbed energy at 0° C. was less than 10 J and the toughness of the joint fell.

Further, No. 14 is an example where the liquid phase diffusion bonding temperature in the secondary bonding was 820° C. or lower than and deviating from the conditions of the present invention and the melting point of the amorphous alloy foil for liquid phase diffusion bonding was not reached, so the brazed structure formed by the resistance welding separated into the borides and Ni base alloy and became brittle and the joint ended up separating.

TABLE 1

Chemical Composition of Bonding Foil (at %)

| Bonding foil symbol | Base | Si | B | P | V | Melting point (° C.) |
|---|---|---|---|---|---|---|
| A | Ni | 3.5 | 8 | — | 11 | 1073 |
| B | Fe | 2.5 | 12 | — | 8 | 1122 |
| C | Ni | 0.8 | — | 15 | 7 | 942 |

TABLE 2

Main Chemical Composition of Bonded Materials (mass %)

| Bonded material symbol | Steel type | C | Si | Mn | Fe | Cr | Ni | Mo | Nb | V | N | Al | Ti |
|---|---|---|---|---|---|---|---|---|---|---|---|---|---|
| a | STPA28 | 0.1 | 0.3 | 0.5 | bal. | 9 | — | 1 | 0.05 | 0.2 | 0.04 | — | — |
| b | SCM440 | 0.4 | 0.25 | 0.7 | bal. | 1 | — | 0.2 | — | — | — | — | — |
| c | SUH11 | 0.5 | 1.8 | 0.2 | bal. | 9 | — | 0.5 | — | — | — | — | — |
| d | SUH35 | 0.5 | 0.2 | 9 | bal. | 21 | — | 4 | — | — | 0.4 | — | — |
| e | INCONEL600 | 0.1 | 0.12 | 0.5 | 8.3 | 17 | bal. | — | — | — | — | — | — |
| f | Ti-6Al-4V | 0.05 | — | — | 0.16 | — | — | — | — | 4.24 | — | 6.21 | Bal. |

TABLE 3

Process Conditions and Joint Properties of Method of Present Invention

| | | Primary bonding (provisional attachment for liquid phase diffusion bonding by resistance welding) | | | | | Secondary bonding (liquid phase diffusion bonding) | | | | |
|---|---|---|---|---|---|---|---|---|---|---|---|
| Ex. no. | Bonded material symbol | Current value of resistance welding (A/mm²) | Applied pressure (MPa) | Total oxide length of bonding line (µm) | Bonding layer width (µm) | Joint efficiency | Bonding holding time (sec) | Cooling rate after bonding ° C./s | Liquid phase diffusion bonding temperature ° C. | Maximum crystal grain size of joint (µm) | Bonding foil symbol |
| 1 | a | 180 | 50 | 0.2 | 4 | 0.8 | 31 | 5 | 1180 | 180 | A |
| 2 | d | 1200 | 50 | 0.1 | 4 | 1.3 | 38 | 5 | 1170 | 190 | A |
| 3 | f | 1500 | 80 | 0 | 6 | 1.2 | 90 | 5 | 980 | 250 | C |
| 4 | b | 1200 | 80 | 0.3 | 3 | 1.5 | 240 | 5 | 1190 | 300 | B |
| 5 | c | 25000 | 40 | 0.1 | 2 | 1.4 | 35 | 0.3 | 1240 | 240 | A |
| 6 | e | 40000 | 30 | 0 | 5 | 1.8 | 1200 | 14 | 1200 | 480 | B |
| 7 | a | 1800 | 90 | 0 | 2 | 1.1 | 90 | 2 | 1150 | 140 | B |
| 8 | b | 1200 | 30 | 0.3 | 6 | 1.9 | 81 | 1 | 1250 | 150 | A |
| 9 | e | 600 | 20 | 0.2 | 7 | 0.7 | 2400 | 10 | 1280 | 450 | A |

| | | Evaluation of joint | | | |
|---|---|---|---|---|---|
| Ex. no. | Bonded material symbol | Joint strength/parent material strength | Joint toughness | Deformation (%) | Class |
| 1 | a | 1.02 | Good | 3.1 | Inv. ex. |
| 2 | d | 1.1 | Good | 3.7 | Inv. ex. |
| 3 | f | 1.03 | Good | 3.6 | Inv. ex. |
| 4 | b | 1.2 | Good | 4.1 | Inv. ex. |
| 5 | c | 1.05 | Good | 3.9 | Inv. ex. |
| 6 | e | 1.02 | Good | 4.5 | Inv. ex. |

TABLE 3-continued

Process Conditions and Joint Properties of Method of Present Invention

| | | | | | |
|---|---|---|---|---|---|
| 7 | a | 1.08 | Good | 3.6 | Inv. ex. |
| 8 | b | 1.4 | Good | 3.8 | Inv. ex. |
| 9 | e | 1.2 | Good | 3.8 | Inv. ex. |

Total oxide length of bonding line = total of lengths of oxide-based inclusions present on substantially center line of bonding layer of cross-sectional structure of bond when observed under optical microscope/length of bonding layer
Bonding layer width = thickness of bonding layer parallel to direction of pressure at time of resistance welding of cross-sectional structure of bond
Joint efficiency = (bevel area of bonded materials)/(area of joint portion after bonding where bonding metal foil is interposed)
Maximum crystal grain size of joint = diameter of largest of old γ-grain sizes or ferrite grain sizes at bonding layer and heat affected zone after bonding
Joint toughness = "good" when absorbed energy at 0° C. is 21 J or more and "poor" when less than 21 J.
Amount of deformation = amount of deformation in direction of application of bonding stress

TABLE 4

Process Conditions and Joint Properties of Comparative Examples

| | | Primary bonding (provisional attachment for liquid phase diffusion bonding by resistance welding) | | | | | Secondary bonding (liquid phase diffusion bonding) | | | | |
|---|---|---|---|---|---|---|---|---|---|---|---|
| Ex. no. | Bonded material symbol | Current value of resistance welding (A/mm$^2$) | Applied pressure (MPa) | Total oxide length of bonding line (μm) | Bonding layer width (μm) | Joint efficiency | Bonding holding time (sec) | Cooling rate after bonding ° C./s | Liquid phase diffusion bonding temperature ° C. | Maximum crystal grain size of joint (μm) | Bonding foil symbol |
| 10 | a | 110 | 40 | 0.2 | 5 | 0.9 | | | NA | | |
| 11 | b | 180 | 30 | 18 (foil not interposed) | — | 1.1 | | | | | |
| 12 | c | | | NA | | | 40 | 0.5 | 1150 | 240 | A |
| 13 | e | | | | | | 7200 | 0.2 | 1240 | 1200 | B |
| 14 | d | 560 | 60 | 0.5 | 7 | 1.2 | 1500 | 0.7 | 820 | 450 | A |

| | | Evaluation of joint | | | |
|---|---|---|---|---|---|
| Ex. no. | Bonded material symbol | Joint strength/parent material strength | Joint toughness | Deformation (%) | Class |
| 10 | a | 0.6 | Good | 5.1 | Comp. ex. |
| 11 | b | 0.4 | Good | 5.6 | Comp. ex. |
| 12 | c | 0.3 | Good | 2.8 | Comp. ex. |
| 13 | e | 1.1 | Poor | 3.7 | Comp. ex. |
| 14 | d | 0 | Good | 5.3 | Comp. ex. |

Total oxide length of bonding line = total of lengths of oxide-based inclusions present on substantially center line of bonding layer of cross-sectional structure of bond when observed under optical microscope/length of bonding layer
Bonding layer width = thickness of bonding layer parallel to direction of pressure at time of resistance welding of cross-sectional structure of bond
Maximum crystal grain size of joint = diameter of largest of old γ-grain sizes or ferrite grain sizes at bonding layer and heat affected zone after bonding
Joint toughness = "good" when absorbed energy at 0° C. is 21 J or more and "poor" when less than 21 J.
Amount of deformation = amount of deformation in direction of application of bonding stress Example 2

Next, the same procedure as in the invention examples of Nos. 2 to 8 shown in Table 3 of Example 1 was followed to bond branch pipes 2 and pipe bodies 1 shown in FIG. 8. At that time, as shown in Table 5, Table 6, and Table 7, metal machine parts bonded under conditions changing the dimensions of the thickness t etc. of the branch pipes 2 of the cylindrical metal materials and the bevel conditions of the branch pipes 2 (inner surface bevel height A, outer surface bevel height B, and distance C from abutting contact point to outer circumference) at the time of abutting were produced and were measured and evaluated for joint mechanical properties, in particular the fatigue strengths. Note that the chemical compositions of the amorphous alloy foils for liquid phase diffusion bonding and bonded materials used were the same as in Example 1. Further, the same procedure as in Example 1 was used for production except for the bonding conditions shown in Tables 5 and 6.

The metal machine parts obtained were subjected to tensile tests in the direction pulling away from the bonding faces and fatigue impact tests and were evaluated for joint strengths and joint fatigue strengths. The results are shown in Table 6 and Table 7.

Note that in Table 6 and Table 7, the evaluation of the joint strength is shown by the ratio of the tensile strength of the bonded joint with respect to the tensile strength of the parent material. If the value is 1, this means that the parent material breaks, while if less than 1, it means that the joint breaks. Further, the fatigue strengths of the joints were measured and evaluated by subjecting the metal machine parts obtained to internal pressure fatigue tests and durability tests in a stress range of 20 to 200 MPa and 10 million cycles (15 Hz) and judging parts not cracking or breaking as "good" and parts cracking or breaking as "poor".

Nos. 15 to 28 shown in Table 6 and Nos. 29 to 32 shown in Table 7 are all examples where the primary bonding (resistance welding) and secondary bonding (liquid phase diffusion bonding) prescribed in the present invention are performed and where like the invention examples shown in Example 1, the joint strength was greater than the strength of the parent materials and superior results were obtained in joint properties compared with the conventional method.

Among the invention examples, Nos. 15 to 28 shown in Table 6 are invention examples of production performed by bevel conditions of the cylindrical metal materials defined in the more preferable embodiments of the present invention within the scope of the present invention, while Nos. 29 to 32 shown in Table 7 are invention examples of production performed by conditions outside the more preferable range of the present invention.

Nos. 15 to 28 shown in Table 6 are examples where the relations among the inner surface bevel heights A and outer surface bevel heights B of the branch pipes 2 of the cylindrical metal materials, the distances C from the abutting contact points to the outer circumferences, and the thicknesses t of the branch pipes 2 satisfy the more preferable conditions of the present invention, that is, $0.2 \leq B/A \leq 1$ and $C/t \leq 0.5$, so none of the bonded joints broke after the internal pressure fatigue tests and superior joint fatigue strengths were obtained. Further, since the holding times of the liquid phase diffusion bonding were short, the maximum crystal grain sizes of the joints were fine sizes of not more than 500 μm and the joint toughnesses were also excellent. Among these, further, Nos. 16 to 22, 24, and 26 to 28 where the conditions of the maximum residual heights of the bevel ends after the primary bonding, the joint efficiencies after the primary bonding, and the residual heights of the bevel ends after secondary bonding were all in the more preferable ranges of the present invention were further improved in results in the joint fatigue tests compared with Nos. 15, 23, and 25 deviating from one of these preferable conditions.

On the other hand, Nos. 29 to 32 of Table 7 are invention examples where the relations among the inner surface bevel heights A and outer surface bevel heights B of the branch pipes 2, the distances C from the abutting contact points to the outer circumferences, and the thicknesses t of the branch pipes 2 were outside the more preferred scope of the present invention.

Nos. 29 and 30 are examples where the ratios B/A of the heights of the bevel of the branch pipe 2 were larger than 1, that is, the outer surface bevel heights were higher than the inner surface sides. In this case, on top of the originally high outer surface side, the pipe flares out slightly during the resistance welding. Due to this deformation, a groove easily remains at the outer surface side easily. When observing the joint cross-section after the resistance welding, the residual height of the bevel end became a large 100 μm or more and the joint efficiency also dropped. Further, No. 30 had an abutting contact point positioned closer to the inner surface side, that is, C/t>0.5, so the bevel at the inner surface side deformed preferentially and as a result the bevel end at the outer surface side largely remained.

No. 31 is an example where the ratio B/A of the heights of the bevel is in the scope of the invention, but when the position of the abutting contact point is C/t>0.5, in the same way as No. 30, deformation concentrated at the inner surface side of the bevel, so the end of the bevel at the outer surface side remained and the residual height became a large one of at least 100 μm.

As a result of the above, Nos. 29 to 31 cracked from the ends of the bevels at the outer surface sides in internal pressure fatigue tests and broke at numbers of cycles below the predetermined number of cycles.

No. 32 is an example of a ratio B/A of heights of the bevel of not more than 0.2, that is, where the height of the bevel at the inner surface side is at least five times the height of the bevel at the outer surface side. In this case, the bevel at the outer side deformed during the resistance welding and closed at the end, but much of the bevel at the inner surface side remained. The residual height of the bevel end became a large one of at least 100 μm at the inner surface side. As a result, Comparative Example 32 cracked from the bevel end at the inner surface side in the internal pressure fatigue test and broke at a number of cycles below the predetermined number of cycles.

TABLE 5

Types of Branch Pipes

| Branch pipe | Test piece dimensions (mm) | | |
| --- | --- | --- | --- |
| no. | Outside dia. | Inside dia. | Thickness |
| i | 10 | 6 | 2 |
| ii | 26 | 17 | 4.5 |
| iii | 42 | 32 | 5 |
| iv | 50 | 38 | 6 |

TABLE 6

Process Conditions and Joint Properties of Method of Present Invention

| | | | Test piece dimensions (mm) | | | | | Primary bonding (provisional attachment for liquid phase diffusion bonding by resistance welding) | | | |
| --- | --- | --- | --- | --- | --- | --- | --- | --- | --- | --- | --- |
| | | | Dimensions of bevel part | | | | | Current value of resistance welding (A/mm²) | Applied pressure (MPa) | Maximum residual height of bevel end (mm) | Joint efficiency |
| Ex. no. | Bonded material symbol | Pipe no. | A (inner surface side) | B (outer surface side) | C | B/A | C/t | | | | |
| 15 | a | i | 0.07 | 0.06 | 1.00 | 0.86 | 0.50 | 500 | 45 | 0.109 | 0.85 |
| 16 | c | i | 0.06 | 0.06 | 1.00 | 1.00 | 0.50 | 350 | 50 | 0.066 | 0.93 |

TABLE 6-continued

| Ex. no. | | | | | | | | | |
|---|---|---|---|---|---|---|---|---|---|
| 17 | e | i | 0.06 | 0.02 | 1.00 | 0.33 | 0.50 | 300 | 60 | 0.058 | 0.96 |
| 18 | b | i | 0.06 | 0.02 | 0.70 | 0.33 | 0.35 | 350 | 50 | 0.044 | 0.99 |
| 19 | a | ii | 0.04 | 0.02 | 2.25 | 0.50 | 0.50 | 250 | 60 | 0.074 | 0.95 |
| 20 | c | ii | 0.05 | 0.02 | 2.00 | 0.40 | 0.44 | 250 | 60 | 0.035 | 0.94 |
| 21 | b | ii | 0.04 | 0.02 | 1.50 | 0.50 | 0.33 | 250 | 60 | 0.068 | 0.98 |
| 22 | a | iii | 0.07 | 0.03 | 2.00 | 0.43 | 0.40 | 175 | 45 | 0.051 | 0.91 |
| 23 | a | iv | 0.08 | 0.07 | 3.00 | 0.88 | 0.50 | 390 | 50 | 0.113 | 0.79 |
| 24 | b | iv | 0.05 | 0.03 | 2.00 | 0.60 | 0.33 | 250 | 60 | 0.072 | 0.94 |
| 25 | d | iv | 0.10 | 0.02 | 2.00 | 0.20 | 0.33 | 255 | 60 | 0.098 | 0.87 |
| 26 | e | iv | 0.08 | 0.04 | 3.00 | 0.50 | 0.50 | 390 | 50 | 0.045 | 0.91 |
| 27 | f | iv | 0.05 | 0.02 | 3.00 | 0.40 | 0.50 | 250 | 60 | 0.066 | 0.96 |
| 28 | c | iv | 0.05 | 0.01 | 2.00 | 0.20 | 0.33 | 250 | 60 | 0.044 | 0.98 |

| | Secondary bonding (liquid phase diffusion bonding) | | | | Joint evaluation | | |
|---|---|---|---|---|---|---|---|
| Ex. no. | Bonding holding time (sec) | Cooling rate after bonding (° C./s) | Liquid phase diffusion bonding temperature (° C.) | Maximum residual height of bevel end (mm) | Bonding foil symbol | Joint strength/parent material strength | Internal pressure fatique test | Class |
| 15 | 3600 | 10 | 1280 | 0.072 | A | 1.03 | Good | Inv. ex. |
| 16 | 1800 | 2 | 1150 | 0.013 | B | 1.13 | Good | Inv. ex. |
| 17 | 60 | 2 | 1250 | 0 | C | 1.15 | Good | Inv. ex. |
| 18 | 360 | 50 | 1180 | 0 | B | 1.14 | Good | Inv. ex. |
| 19 | 420 | 5 | 1200 | 0 | A | 1.1 | Good | Inv. ex. |
| 20 | 2400 | 10 | 1170 | 0 | A | 1.19 | Good | Inv. ex. |
| 21 | 90 | 5 | 1240 | 0 | C | 1.08 | Good | Inv. ex. |
| 22 | 1800 | 2 | 1150 | 0.011 | C | 1.07 | Good | Inv. ex. |
| 23 | 1800 | 0.1 | 1160 | 0.081 | A | 1.03 | Good | Inv. ex. |
| 24 | 400 | 5 | 1200 | 0.005 | C | 1.07 | Good | Inv. ex. |
| 25 | 1200 | 5 | 1150 | 0.076 | B | 1.04 | Good | Inv. ex. |
| 26 | 30 | 10 | 1250 | 0.023 | A | 1.05 | Good | Inv. ex. |
| 27 | 600 | 10 | 1160 | 0 | A | 1.09 | Good | Inv. ex. |
| 28 | 400 | 5 | 1200 | 0 | B | 1.16 | Good | Inv. ex. |

Maximum residual height of bevel end = Maximum value of cylindrical axis direction distance between bevel end and bonded surface after primary bonding or secondary bonding
Internal pressure fatigue test = Test pieces passing durability test comprising stress range of 20–200 MPa/10,000,000 repetitions (15 Hz) indicated as "good" and failing test as "poor".

TABLE 7

Process Conditions and Joint Properties of Comparative Examples

| | | | Test piece dimensions (mm) | | | | | Primary bonding (provisional attachment for liquid phase diffusion bonding by resistance welding) | | | |
|---|---|---|---|---|---|---|---|---|---|---|---|
| | | | Dimensions of bevel part | | | | | Current value | | Maximum residual | |
| Ex. no. | Bonded material symbol | Pipe no. | A (inner surface side) | B (outer surface side) | C | B/A | C/t | of resistance welding (A/mm²) | Applied pressure (MPa) | height of bevel end (mm) | Joint efficiency |
| 29 | a | i | 0.07 | 0.10 | 1.00 | 1.43 | 0.50 | 500 | 50 | 0.176 | 0.72 |
| 30 | c | ii | 0.05 | 0.06 | 3.00 | 1.20 | 0.67 | 450 | 60 | 0.200 | 0.61 |
| 31 | a | iii | 0.07 | 0.07 | 3.00 | 1.00 | 0.60 | 300 | 65 | 0.156 | 0.73 |
| 32 | a | iv | 0.08 | 0.01 | 2.50 | 0.13 | 0.42 | 380 | 50 | 0.320 | 0.67 |

Maximum residual height of bevel end = Maximum value of cylindrical axis direction distance between bevel end and bonded surface after primary bonding or secondary bonding

| | Secondary bonding (liquid phase diffusion bonding) | | | | Joint evaluation | | |
|---|---|---|---|---|---|---|---|
| Ex. no. | Bonding holding time (sec) | Cooling rate after bonding (° C./s) | Liquid phase diffusion bonding temperature (° C.) | Maximum residual height of bevel end (mm) | Bonding foil symbol | Joint strength/parent material strength | Internal pressure fatigue test | Class |
| 29 | 600 | 10 | 1250 | 0.123 | A | 1.03 | Poor | Inv. ex. |
| 30 | 360 | 5 | 1200 | 0.135 | B | 1 | Poor | Inv. ex. |
| 31 | 400 | 5 | 1200 | 0.122 | C | 1.06 | Poor | Inv. ex. |
| 32 | 550 | 2 | 1200 | 0.25 | B | 1.06 | Poor | Inv. ex. |

Internal pressure fatigue test = Test pieces passing durability test comprising stress range of 20–200 MPa/10,000,000 repetitions (15 Hz) indicated as "good" and failing test as "poor".

Example 3

Figure 9:
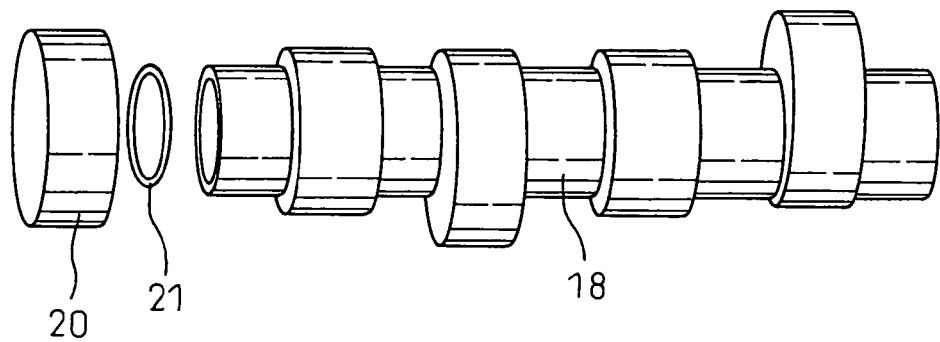
FIG. 9 is a cross-sectional perspective view of an embodiment in the case of butt bonding a metal material and a hollow metal material.
Figure 10:
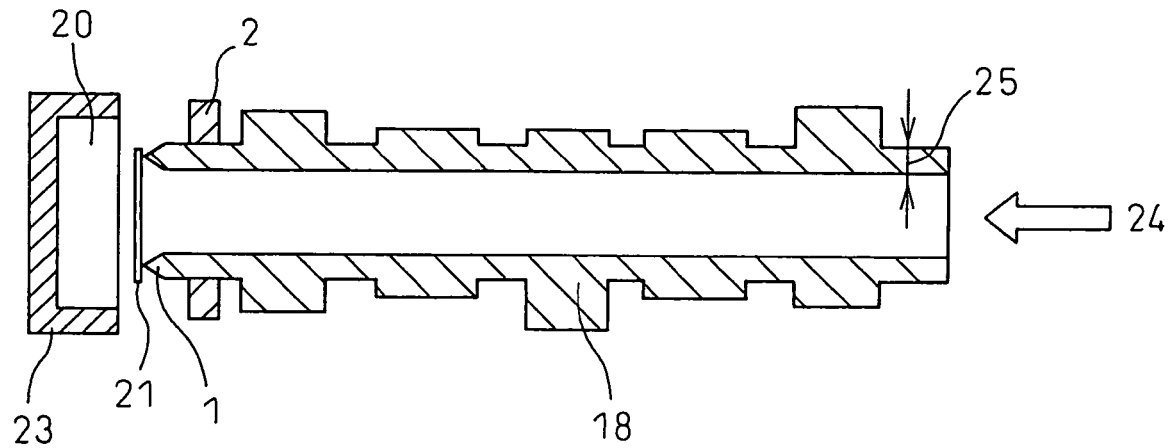
FIG. 10 is a cross-sectional view of a bevel running along a center axis of a hollow metal material and vertical to the bonding faces before bonding of the metal machine part.

Next, an explanation will be given of an example of application of the bonding method of the present invention when producing hollow metal machine parts such as various types of motor cam shafts fabricated conventionally by casting, forging and cutting, etc. as shown in FIG. 9.

Liquid phase diffusion amorphous alloy foils having two types of chemical compositions of the symbols A and B and melting points shown in Table 1 and bonded materials comprised of ferrous metals having the chemical compositions of the symbols "a" and "b" shown in Table 2 were used to produce metal machine parts shown in FIG. 9 by the following procedure under the bonding conditions shown in Table 8.

That is, as shown in FIG. 9, the end of a hollow metal material 18 forming one bonding face was machined in advance to give a V-bevel having an angle of 45°. The bonding faces of the bevel 19 of the hollow metal material 18 and the metal material 20 were made to abut against each other through a ring-shaped liquid phase diffusion bonding alloy foil 21, then electrodes 22 and 23 brought into close contact with the hollow metal material 18 and the metal material 20 were used to run a DC current through the bevel 19 parts. At the same time, a pressing stress 24 was applied. Note that the pressing stress 24 was applied through a stress transmitting plate (not shown) operating by oil pressure from above the hollow metal material 18. As a result, the bevel 19 of the hollow metal material 18 collapsed under the pressure and deformed to the same thickness as the thickness 25 of the hollow metal material 18. Further, the liquid phase diffusion bonding alloy foil 21 interposed between the bevels of the hollow metal material 18 and the metal material 20 formed an alloy layer after melting once, then solidifying, but the bonding time was extremely short, so the result was an incomplete isothermal solidification structure with an average thickness of less than 3 μm, that is a so-called "brazed structure" where the diffusion-limited isothermal solidification was not ended.

Next, as secondary bonding, the bonded joint was raised to the reheating temperature described in Table 8 by an electric furnace having a high frequency induction heating coil and resistance heat generating element and held there for a predetermined time, whereby the diffusion-limited isothermal solidification of the bonding alloy layer formed in the primary bonding was ended, then the joint was cooled.

The metal machine parts obtained were subjected to tensile tests in the direction pulling away from the bonding face and charpy impact tests at the bonds at 0° C. and were evaluated for joint strengths and joint toughnesses. Further, the amounts of deformation in the direction of application of bonding stress of the metal machine parts were measured and the amounts of deformation evaluated. The results are shown in Table 8.

Note that in Table 8, the evaluation of the joint strength is shown by the ratio of the tensile strength of the bonded joint with respect to the tensile strength of the parent material. If the value is 1, this means that the parent material breaks, while if less than 1, it means that the joint breaks. Further, the evaluation of the joint toughness is "good" when the absorbed energy at 0° C. is 21 J or more and "poor" when it is less than 21 J.

From the results of Table 8, Example Nos. 33 to 35 of production of metal machine parts under bonding conditions in the scope of the present invention by the bonding method of the present invention all had thicknesses of the bonding layers after primary bonding of an average of not more than 10 μm and joint strengths measured after secondary bonding of over the tensile strengths of the parent materials at all times. Further, the amounts of deformation in the direction of application of bonding stress were not more than 5% or satisfactory in terms of performance in use as metal parts. Further, since the holding times of the liquid phase diffusion bonding were short, the maximum crystal grain sizes of the joints were fine sizes of not more than 500 μm and the joint toughnesses were also good.

TABLE 8

Process Conditions and Joint Properties of Method of Present Invention

| | | Primary bonding (provisional attachment for liquid phase diffusion bonding by resistance welding) | | | | | Secondary bonding (liquid phase diffusion bonding) | | | | |
|---|---|---|---|---|---|---|---|---|---|---|---|
| Ex. no. | Bonded material symbol | Current value of resistance welding (A/mm²) | Applied pressure (MPa) | Total oxide length of bonding line (μm) | Bonding layer width (μm) | Joint efficiency | Bonding holding time (sec) | Cooling rate after bonding °C./s | Liquid phase diffusion bonding temperature °C. | Maximum crystal grain size of joint (μm) | Bonding foil symbol |
| 33 | a | 180 | 100 | 0.4 | 5 | 0.9 | 60 | 5 | 1200 | 180 | A |
| 34 | a | 220 | 110 | 0.1 | 2 | 1.1 | 90 | 5 | 1200 | 200 | B |
| 35 | b | 180 | 90 | 0.3 | 3 | 1.1 | 60 | 5 | 1250 | 160 | B |

| | | Evaluation of joint | | | |
|---|---|---|---|---|---|
| Ex. no. | Bonded material symbol | Joint strength/parent material strength | Joint toughness | Deformation (%) | Class |
| 33 | a | 1.09 | Good | 3.8 | Inv. ex. |
| 34 | a | 1.04 | Good | 4.4 | Inv. ex. |
| 35 | b | 1.01 | Good | 4.1 | Inv. ex. |

TABLE 8-continued

Process Conditions and Joint Properties of Method of Present Invention

Total oxide length of bonding line = total of lengths of oxide-based inclusions present on substantially center line of bonding layer of cross-sectional structure of bond when observed under optical microscope/length of bonding layer
Bonding layer width = thickness of bonding layer parallel to direction of pressure at time of resistance welding of cross-sectional structure of bond
Joint efficiency = (bevel area of bonded materials)/(area of joint portion after bonding where bonding metal foil is interposed)
Maximum crystal grain size of joint = diameter of largest of old γ-grain sizes or ferrite grain sizes at bonding layer and heat affected zone after bonding
Amount of deformation = amount of deformation in direction of application of bonding stress

INDUSTRIAL APPLICABILITY

As explained above, when using liquid phase diffusion bonding to form a joint and produce a metal machine part, the present invention interposes an amorphous alloy foil for liquid phase diffusion bonding at the bevels of metal materials, melt bonds the amorphous alloy foil by resistance welding as primary bonding to provide an extremely thin bonding alloy layer formed by the melting and solidification of the amorphous alloy foil, then provides an isothermal solidification process of liquid phase diffusion bonding at a reheating temperature of at least the melting point of the amorphous alloy foil and thereby can give a joint with homogeneity of structure and excellent tensile strength, toughness, fatigue strength, and other mechanical properties and with little deformation. As a result, it is possible to produce metal machine parts with a high joint quality and reliability with a high productivity. Further, regarding the fatigue stress of a bonded joint with at least one of its members comprised of a cylindrical metal material, which was a problem in the conventional resistance welding methods, the interaction between the primary bonding and secondary bonding of the present invention enables the occurrence of fine cracks in the welded part to be reduced and the unbonded residual amount of the bevel end to be reduced and enables a joint superior in fatigue strength and a metal machine part made by the same to be produced.

The present invention provides a completely new welding technique for metal machine parts enabling metal machine parts of shapes unable to be produced in the past by ordinary machining, grinding, and boring and further low productivity, low material yield, high cost metal machine parts to be produced with a high productivity and low cost and can contribute greatly to the improvement of functions and supply of metal machine parts able to be achieved by the application of liquid phase diffusion bonding. In particular, in the production of camshafts and other hollow parts, shafts used for various types of motors, etc. which used to be fabricated by casting, forging and cutting or metal machine parts using just a liquid phase diffusion bonding method in the past, application of the method of the present invention promises the reduction of the production cost, improvement of the productivity, improvement of the quality of the bond, and other effects. The contribution of the present invention to industry is therefore enormous.

The invention claimed is:

1. A melt bonding and liquid phase diffusion bonding method of a metal machine part, characterized by
    interposing an amorphous alloy foil for liquid phase diffusion bonding between a first bonding face of a first metal material and a non-beveled second bonding face a second metal material, wherein said first bonding face forms a V-bevel which contacts said non-beveled second bonding face at the tip of said V-bevel through said amorphous alloy foil,
    performing primary bonding by melt bonding said amorphous alloy foil and said first and second metal materials to form a joint, wherein said primary bonding comprises (i) passing an electrical current across said first and second metal materials through said V-bevel tip and said amorphous alloy foil to heat said V-bevel and said amorphous alloy foil and (ii) applying a pressing stress such that said V-bevel and said amorphous alloy foil are melted and said V-bevel is collapsed to form said joint,
    then performing secondary bonding by reheating said joint to at least the melting point of said amorphous alloy foil, and allowing an isothermal solidification process of said joint to complete.

2. A melt bonding and liquid phase diffusion bonding method of a metal machine part as set forth in claim 1, characterized in that the composition of said amorphous alloy foil is Ni or Fe as a base and, as diffusion atoms, one or more of B, P, and C in amounts of 0.1 to 20.0 at % and further V in 0.1 to 10.0 at %.

3. A melt bonding and liquid phase diffusion bonding method of a metal machine part as set forth in claim 1, characterized in that said current is 100 to 100,000 A/mm$^2$.

4. A melt bonding and liquid phase diffusion bonding method of a metal machine part as set forth in claim 1, characterized in that said pressing stress is 10 to 1,000 MPa.

5. A melt bonding and liquid phase diffusion bonding method of a metal machine part as set forth in claim 1, characterized in that a joint efficiency of said joint formed by said primary bonding is 0.5 to 2.0,
    where the "joint efficiency" is the ratio of the area of the bevel faces of the metal materials to the area of the joint after melt bonding the amorphous alloy foil and metal materials.

6. A melt bonding and liquid phase diffusion bonding method of a metal machine part as set forth in claim 1, characterized by cooling said joint after the isothermal solidification process by a cooling rate of 0.1 to 50° C./sec to control the joint structure.

7. A melt bonding and liquid phase diffusion bonding method of a metal machine part characterized by interposing an amorphous alloy foil for liquid phase diffusion bonding between metal materials including at bevel faces of at least one metal material of metal materials to be bonded,
    performing primary bonding by melt bonding said amorphous alloy foil and said metal materials by resistance welding to form a joint, wherein said resistance welding melts said amorphous metal foil and said bevel faces of said at least one metal material, then performing secondary bonding by liquid phase diffusion bonding by reheating said joint to at least the melting point of said amorphous alloy foil, then holding it there to complete an isothermal solidification process of said joint;
    characterized in that said at least one of said metal materials is a cylindrical metal material and in that a V-bevel is formed at an end of said cylindrical metal material so that, when bringing the end of said cylindrical metal material into abutment with the surface of another metal material for primary bonding, an inner surface bevel height A and an outer surface bevel height B of said cylindrical metal material with respect to the abutting contact point and a distance C from said abutting contact point to the outer circumference satisfy the following relation (1):

$$0.2 \leq B/A \leq 1 \text{ and } C/t \leq 0.5 \qquad (1)$$

where A is an inner surface bevel height of said cylindrical metal material, B is an outer surface bevel height of said cylindrical metal material, C is a distance from an abutting contact point of the cylindrical metal material to the outer circumference, and t is the thickness of the cylindrical metal material;

characterized in that a maximum residual height of the bevel ends after said primary bonding is not more than three times the thickness of said amorphous alloy foil.

8. A melt bonding and liquid phase diffusion bonding method of a metal machine part as set forth in claim 7, characterized in that a joint efficiency after said primary bonding is at least 0.8, wherein joint efficiency is the ratio of the area of bevel faces of the metal materials to the area of the joint after melt bonding the amorphous alloy foil and metal materials.

9. A melt bonding and liquid phase diffusion bonding method of a metal machine part as set forth in claim 7, characterized in that a maximum residual height of the bevel ends after said secondary bonding is not more than 70 μm.

10. A melt bonding and liquid phase diffusion bonding method of a metal machine part as set forth in claim 1, wherein said primary bonding is carried out for not more than 10 seconds.

11. A melt bonding and liquid phase diffusion bonding method of a metal machine part as set forth in claim 1, wherein said primary bonding produces a thickness in a pressing direction of an incomplete isothermal solidification structure in a cross-sectional structure of said joint on an average of not more than 10 μm.

12. A melt bonding and liquid phase diffusion bonding method of a metal machine part according to claim 11, wherein said secondary bonding by liquid phase diffusion bonding is carried out without applying an external pressure to said metal materials.

13. A method of bonding a first metal material and a second metal material, comprising:
(a) melt bonding said first metal material to said second metal material to form a joint, wherein a bonding face of said first metal material forms a V-bevel with a bevel tip, wherein only the bevel tip contacts a non-beveled bonding face of said second metal material through an amorphous alloy foil for liquid phase diffusion bonding, and wherein said melt bonding comprises (i) passing an electrical current across said first and second metal materials through said bevel tip and said amorphous alloy foil to heat said bevel and said amorphous alloy foil and (ii) applying a pressing stress such that said bevel and said amorphous alloy foil are melted and said bevel is collapsed to form said joint; and
(b) reheating said joint to at least the melting point of said amorphous alloy foil, and allowing an isothermal solidification process of said joint to complete.

14. The method of claim 13, wherein the composition of said amorphous alloy foil is Ni or Fe as a base and, as diffusion atoms, one or more of B, P, and C in amounts of 0.1 to 20.0 at % and further V in 0.1 to 10.0 at %.

15. The method of claim 13, wherein said melt bonding is carried out for not more than 10 seconds.

16. The method of claim 13, wherein said melt bonding produces a thickness in a pressing direction of an incomplete isothermal solidification structure in a cross-sectional structure of said joint on an average of not more than 10 μm.

17. The method of claim 13, wherein said step (b) is carried out without applying an external pressure to said metal materials.

18. The method of claim 13, wherein said electrical current is 100 to 100,000 A/mm$^2$.

19. The method of claim 13, wherein said pressing stress is 10 to 1,000 MPa.

20. The method of claim 13, wherein said bevel is a V-bevel formed at an end of said first metal material so that, when bringing the end of said first metal material into abutment with the surface of said second metal material, an inner surface bevel height A and an outer surface bevel height B of said first metal material with respect to the abutting contact point and a distance C from said abutting contact point to the outer surface satisfy the following relation (1):

$$0.2 \leq B/A \leq 1 \text{ and } C/t \leq 0.5 \qquad (1)$$

where A is an inner surface bevel height of said first metal material, B is an outer surface bevel height of said first metal material, C is a distance from an abutting contact point of the first metal material to the outer surface, and t is the thickness of the first metal material.

21. The method of claim 13, wherein said melt bonding is carried out by resistance welding.

22. The method of claim 21, wherein said resistance welding is one type of welding method selected from the group consisting of conduction heating type spot welding, projection welding, upset welding, and flash-butt welding.

23. A melt bonding and liquid phase diffusion bonding method of a metal machine part according to claim 1, wherein said primary bonding is carried out by resistance welding.

24. A melt bonding and liquid phase diffusion bonding method of a metal machine part according to claim 23, wherein said resistance welding is one type of welding method selected from the group consisting of conduction heating type spot welding, projection welding, upset welding, and flash-butt welding.

* * * * *